UNITED STATES PATENT OFFICE.

CARLETON ELLIS, OF MONTCLAIR, AND HARRY M. WEBER, OF EAST ORANGE, NEW JERSEY, ASSIGNORS TO ELLIS-FOSTER COMPANY, A CORPORATION OF NEW JERSEY.

CONTACT MATERIAL.

1,204,143.      Specification of Letters Patent.      Patented Nov. 7, 1916.

No Drawing.      Application filed December 17, 1915. Serial No. 67,357.

*To all whom it may concern:*

Be it known that we, CARLETON ELLIS and HARRY M. WEBER, citizens of the United States, and residents of Montclair and East Orange, respectively, in the county of Essex and State of New Jersey, have invented certain new and useful Improvements in Contact Material, of which the following is a specification.

This invention relates to contact material intended for oxidizing operations and the like and relates in particular to a specific form of catalytic agent suitable for the conversion of sulfur dioxid in the presence of oxygen or air into sulfur trioxid.

Our contact material in its preferred embodiment comprises chromium and tin bodies or equivalent material either in loose combination or in intimate mixture and the physical form of such contact material is preferably granules of a highly porous character which have sufficient crushing strength or resistance to compression to resist the fining or crushing action due to the weight of a considerable body of the material when exposed under operating conditions. Such catalytic material may be prepared in a variety of ways and the preferred form of preparation is that of precipitating or incorporating a tin salt with a chromium salt, preferably a chromate or bichromate and preferably furthermore a salt which eliminates the base readily, such, for example, as ammonium bichromate, the solution of which when mixed with a solution of a tin salt, as for example, stannous chlorid and dried, affords a product having the requisite chemical composition for the purpose herein. It is however, ordinarily lacking in porosity or penetrability and such condition may be secured by carefully heating the material in a moist pasty form so as to cause it to intumesce forming porous masses which may be subsequently carefully pulverized or crushed, to form a mixture of coarse and fine granules. These may be suitably screened to give a granular product possessing sufficient permeability to allow the ready flow of the gases to be treated. It is not necessary to screen the material to any very definite degree so long as the voids are not unduly filled with fine material. A mixture which passes a six mesh and from which the fines are removed by an eigthy mesh screen has given good results. The porosity is favorably influenced by a preponderating amount of chromium and in consequence to some extent the activity of the catalyzer, as the degree of conversion, depends upon the surface condition and any means of extending the surface is beneficial. In some cases, even, an extending material may be added.

The degree of intumescence may be improved by the addition of oxalic acid, sugar and other material which are oxidized on heating in the presence of the chromium compound illustratively specified giving off gases which improve the porosity of the contact material. The catalyzer prepared in this manner contains ammonium chlorid which may be removed by careful ignition and the last traces of the volatile salt are removed to advantage by means of a current of some gas. During this operation the product bakes or sinters slightly and thereby hardens acquiring the desired compressive or crushing resistance. Care should be taken not to sinter to such a degree that the porosity of the material is affected. In some cases the baking operation may be omitted entirely.

The essential active agent is the chromium material which however is unable to effect a degree of conversion much over 80% or thereabout under the best working conditions. In the presence of the tin, however, the activity of the chromium is accelerated and improved and a conversion of 90% or upward of sulfur dioxid into sulfur trioxid is obtained. This increase in conversion is of great importance from the technical standpoint.

The function of the tin appears to be largely an activating agent for the chromium and in consequence the relative proportion of tin to chromium may be varied within wide limits. A proportion of five to ten per cent. of tin up to fifty or sixty per cent. has given good results in practice but preferably we keep the tin content in the neighborhood of about twenty per cent.

This contact material is somewhat sensitive under conditions which are too strongly reducing; for example, a high percentage of sulfur dioxid (with a deficiency of free oxygen) maintained over a considerable period affects the catalyzer unfavorably and reoxidation is necessary to restore the catalyzer to its original condition. It is better therefore, to adjust the proportion of sulfur dioxid and air so as to maintain the catalyzer in its state of highest activity at all times. These proportions are ordinarily about five to seven per cent. of sulfur dioxid in the gas mixture entering the catalytic material. The catalyzer preferably is maintained at a temperature of 800–900° F. under working conditions.

Besides being affected by too great an excess of sulfur dioxid involving a reducing atmosphere, the activity of the catalyzer has also been observed to diminish from too prolonged oxidation due to exposure for a protracted period to a gas mixture consisting of air and sulfur dioxid, the latter being present in amount less than 3% or thereabout. The conversion falls off in some cases, showing that the catalytic activity is impaired. This is usually restored by increasing the amount of sulfur dioxide. Preferably, this is done by employing for a short time an excess of sulfur dioxide or pure sulfur dioxid may be used for this purpose. Thus, it is evident that for best conditions it is desirable to recognize the condition of equilibrium depending on the proportions of sulfur dioxid and oxygen in the gaseous mixture passing through the contact mass by virtue of which the latter is maintained in such a state of oxidation or degree of reduction, as the case may be, under which condition the maximum measure of conversion of sulfur dioxide to the trioxid is attained.

The contact material is relatively quite resistant to different bodies such as arsenic and the like which quickly poison platinum contact material. It is however, not desirable to have too large an amount of moisture present in the gases and preferably these should be well dried before passing through the contact mass. It does not follow however, that the operation cannot be carried out in the presence of moisture but certain difficulties arise due to the presence of moisture which render drying desirable. Pure hydrogen gas has been found to check the activity of the catalyzer, in fact in one case reducing the conversion to about 11% and thus it appears not to be desirable to have gases present possessing the strong reducing qualities characteristic of hydrogen gas.

It is not the purpose of the present application to discuss the processes involved in the use of this catalytic material, such features being described and claimed in copending applications Serial Number 103,566, filed June 13, 1916, Serial Number 65,285, filed December 6, 1915 and Serial Number 75,028, filed January 28, 1916, filed by Carleton Ellis, nor is the catalytic material broadly claimed herein but in said last mentioned Ellis application in view of the prior work of said Ellis.

What we claim is:—

1. A catalyzer adapted for use in the manufacture of sulfuric acid by the contact process which comprises an intimate mixture of a chromium compound and an activating agent, in the form of a porous body.

2. The process of making catalytic material adapted for use in the manufacture of sulfuric acid by the contact process which comprises incorporating ammonium bichromate with tin chlorid, in exposing the moist product of the reaction to heat to intumesce the material, removing ammonium chlorid by further heating and in baking the product to form granular porous masses of good crushing strength.

3. A process of making a catalyst which comprises subjecting a material containing tin and chromium, in the presence of an organic material, to sufficient heat to produce a rigid intumesced solid material, and comminuting the same to a granular mass.

4. A process of making a catalyst, which comprises intumescing a mixture comprising an oxy-compound of chromium and a tin-bearing substance, and granulating the product.

5. A contact material comprising a porous structure in the form of granules comprising voluminous chromium oxid uncombined with but bonded by an oxy compound of a heavy metal.

6. A contact material comprising a porous structure in the form of granules comprising voluminous chromium oxid and a binding agent which is incapable of destroying the catalytic activity of said chromium oxid.

7. A granular mass of intumesced material comprising oxy compounds of chromium and of a metal capable of increasing the catalytic activity thereof.

8. A granular intumesced material comprising an oxy compound of chromium and a bonding agent capable of increasing the catalytic activity of said oxy compound.

9. A granular porous catalyst comprising a chromium compound and a binder which is incapable of destroying the catalytic activity of said chromium oxid, said catalyst having a relatively high resistance to crushing action.

10. A contact material comprising a porous structure in the form of granules comprising a voluminous chromium oxid and a binding agent capable of increasing the catalytic activity of said chromium oxid, and capable of increasing the resistance of said chromium oxid to crushing action.

11. A granular porous mass comprising chromium oxid bonded by a heavy metal oxid capable of absorbing sulfur dioxid.

CARLETON ELLIS.
HARRY M. WEBER.